United States Patent
DeBenedictis et al.

(10) Patent No.: US 7,498,280 B2
(45) Date of Patent: Mar. 3, 2009

(54) POLYESTER FILAMENT WOVEN FABRIC FOR AIR BAGS

(75) Inventors: Mach A. DeBenedictis, Mooresville, NC (US); Thomas E. Schmitt, Concord, NC (US)

(73) Assignee: Invista North America S.A.R.L., Wilmington, DE (US)

( * ) Notice: Subject to any disclaimer, the term of this patent is extended or adjusted under 35 U.S.C. 154(b) by 31 days.

(21) Appl. No.: 10/555,806

(22) PCT Filed: May 15, 2003

(86) PCT No.: PCT/US03/15388

§ 371 (c)(1),
(2), (4) Date: Nov. 3, 2005

(87) PCT Pub. No.: WO2004/106120

PCT Pub. Date: Dec. 9, 2004

(65) Prior Publication Data

US 2006/0252322 A1     Nov. 9, 2006

(51) Int. Cl.
*D03D 15/00*    (2006.01)

(52) U.S. Cl. .................. 442/181; 428/36.1; 280/728.1; 280/743.1; 442/76; 442/105; 442/164

(58) Field of Classification Search .............. 280/728.1, 280/743.1, 743.2; 442/76, 181, 105, 164; 428/36.1, 365
See application file for complete search history.

(56) References Cited

U.S. PATENT DOCUMENTS

| | | | |
|---|---|---|---|
| 4,977,016 A | 12/1990 | Thornton et al. | |
| 5,010,633 A | 4/1991 | Brown et al. | |
| 5,073,418 A | 12/1991 | Thornton et al. | |
| 5,236,775 A | 8/1993 | Swoboda et al. | |
| 5,540,965 A | 7/1996 | Nishimura et al. | |
| 5,637,114 A | 6/1997 | Hohnke | |
| 5,902,672 A * | 5/1999 | Swoboda et al. | ............ 442/203 |
| 5,989,660 A * | 11/1999 | Moriwaki et al. | .......... 428/35.2 |
| 6,037,047 A | 3/2000 | Fastenau et al. | |
| 6,147,017 A * | 11/2000 | Fastenau et al. | ............. 442/192 |
| 6,471,906 B1 | 10/2002 | DeBenedictis et al. | |

FOREIGN PATENT DOCUMENTS

| | | |
|---|---|---|
| EP | 0442373 | 8/1991 |
| JP | 07-011512 | 1/1995 |
| JP | 07-090747 | 4/1995 |
| JP | 07-186858 | 7/1995 |
| JP | 08-269818 | 10/1996 |
| JP | 2000-027028 | 1/2000 |
| JP | 2000-027029 | 1/2000 |
| JP | 2002-309462 | 10/2002 |

* cited by examiner

*Primary Examiner*—Arti Singh

(57) ABSTRACT

A polyester plain weave fabric construction wherein said fabric has a basis weight of between 150 to 300 $g/m^2$ with tongue tear strength equal to or better than nylon fabrics of the same construction and weight. The present invention relates to both coated and uncoated polyester filament woven fabric. The uncoated fabric is useful for industrial purposes wherein the fabric has a warp tongue tear resistance of at least 0.75 $N/g/m^2$, when the fabric basis weight is between 150 to 300 $g/m^2$ The preferred uncoated polyester filament yarn has a linear density of between about 200 to about 800 dtex, a tenacity of at least 65 cN/tex, a tensile index of at least 350. The fabrics can be coated with chloroprene, neoprene, polyurethane, silicone or other organic coatings to reduce air permeability. The fabric of the present invention may also be constructed with the warp and/or filling yarn having an aspect ratio between 1.2 and 6.

33 Claims, No Drawings

POLYESTER FILAMENT WOVEN FABRIC FOR AIR BAGS

BACKGROUND OF THE INVENTION

1) Field of the Invention

The present invention relates to an uncoated polyester filament woven fabric for air bags. More particularly, the present invention relates to an uncoated polyester woven fabric having a tear strength comparable or exceeding that of a nylon filament woven air bag fabric. The fabric has a warp tongue tear resistance of at least 0.75 N/g/m$^2$. Optionally, these fabrics may be further improved with coatings that decrease air permeability through the fabric. Moreover, these fabrics may be produced with a flat type yarn (oval or rectangular in cross-sectional) that also decreases air permeability through the fabric.

2) Prior Art

Polyester industrial filament yarns have a high strength (greater than 70 cN/tex), a high modulus (greater than 170 cN/tex), a low elongation (10-15%), and an excellent dimensional stability. These yarns are predominately used for rubber reinforcements such as in tires and conveyor belts and v-belts. Higher elongation industrial filament yarns can be achieved at the expense of tenacity and modulus by relaxing the drawn yarn. For applications such as air bags, for example, that require high strength and elongation, polyester industrial filament yarns are deficient and polyamide (nylon) yarns are used. Analysis of failed polyester airbags indicates that the primary mode of failure is the tearing of the fabric. This occurs early in the inflation step as the high-pressure gas first enters the folded bag and before the bag is fully inflated. Therefore, there is a need to develop polyester fabric that has a comparable tongue tear strength to that of nylon.

U.S. Pat. No. 5,540,965 to Nishimura et al. discloses a woven polyester air bag obtained by a shrinkage-setting treatment. This patent discloses that the preferred tensile elongation at break is between 9 and 18%. The patent discloses that if the tensile elongation at break is less than 9% the resulting woven fabric may have an unsatisfactory tensile toughness even after the shrinkage-setting procedure. The patent goes on to state that if the tensile elongation at break is more than 18%, the woven fabric may exhibit an insufficient dry shrinkage and become difficult to control relative to the air permeability of the fabric.

U.S. Pat. Nos. 4,977,016, 5,010,633 and 5,073,418 to Thornton et al. disclose a calendered polyester air bag fabric with specific fabric properties but no disclosure on the polyester yarn properties. They do disclose a fabric elongation at break of greater than 25% and a trapezoid tear resistance of greater than 40 pounds (178 N) wherein the fabric is not more than 8.25 ounces per square yard (280 g/m$^2$). These various fabric (and not yarn) properties can be achieved by special weaving techniques etc. It is impossible to tell whether the properties of the fabric are as a direct result of the yarn or the fabric processing, or how they compare to a nylon fabric.

Japanese unexamined publications 2000-27028 and 27029 to Hisao et al. disclose various processes for achieving tough polyester yarn but give no fabric properties. These publications do disclose a relaxation ratio of 12% or higher. The draw ratio and the temperature of various rolls employed in the drawing stage are important to achieving the yarn properties of the invention disclosed.

Japanese unexamined publication 8-269818 to Masataka et al. discloses tough polyester fibers for use in energy absorbing seat belts having a tensile of 8 grams per denier (71 cN/tex) or greater, an elongation at break of 30% or higher. Lastly, this reference discloses a relaxation ratio of 10% or more. This reference gives no woven fabric tear information.

Japanese unexamined publication 7-11512 to Hideharu et al. discloses a polyester fiber with fine silica particles therein. Also incorporated therein is an additive to lower the glass transition temperature all for the purpose of improving the flexural fatigue property. There is no fabric tear strength data, nor a comparison with nylon fabric.

Japanese patent 2289115 to Yoshihiko discloses a polyester fiber having a tenacity of at least 10 grams per denier (88.2 cN/tex) and elongation at break of at least 15%. The highest reported elongation is 18.8%. No fabric properties are disclosed.

Japanese Application 7-186858 to Kozauro et al discloses lightweight polyester air bag fabrics woven from polyester filament yarns having a tenacity of 9 g/denier (79.4 cN/tex) and a breaking elongation of 15%.

European patent 0 442 373 to Swoboda et al discloses a polyester airbag fabric using yarns of low denier. The yarn tenacity was 66 cN/tex with an elongation at break of 19%, and a hot air shrinkage of 4.7% at 200° C. A 26×26 thread/cm 1/1 plain weave fabric had a breaking strength of 255×265 daN with an extension of 34%×26%. (The values indicated on either side of x represent the properties in the warp×weft.) No fabric tear properties were reported.

U.S. Pat. No. 5,236,775 to Swoboda et al discloses an un-calendered, uncoated polyester air bag fabric. No fabric tear data, nor a comparison with a nylon air bag fabric, was given.

U.S. Pat. No. 5,637,114 to Höhnke discloses a polyester uncoated air bag fabric. A 470 dtex, 100 filament yarn was woven in a ripstop construction (5 mm) using 22/22 threads/cm. The yarn had a tenacity of 66.8 cN/tex and a breaking elongation of 21.5% with a hot air shrinkage at 200° C. of 7.4%. The fabric, before washing and drying, had a basis weight of 229 g/m$^2$, a breaking strength/elongation of 297 daN/32% and 325 daN/24% in the warp and weft directions respectively, and a tear strength of 25/24 daN in the warp and weft directions respectively. It is well known that ripstop fabrics will have a higher tear strength than a plain weave.

U.S. Pat. No. 5,902,672 to Swoboda et al discloses a polyester uncoated air bag fabric using a modified huckaback or crepe weave. A ripstop fabric woven from a 315 dtex, 100 filament yarn, with 28 threads/cm, had a basis weight of 197 g/m$^2$ and a tongue tear of 14 daN in both warp and weft directions. No comparison was made to a nylon fabric.

Japanese Application 7-90747 to Nibo et al discloses both nylon and polyester fabrics woven to manufacture, after heat setting and calendaring, an uncoated air bag fabric. The tear strength of the fabrics was measured according to JIS K6328 5.3.6. A direct fabric comparison woven from a 467 dtex, a 216 filament polyester and nylon yarn was made. This showed that a polyester fabric woven at 66×66 ends/inch (26×26 ends/cm) had comparable tensile strength and elongation to a nylon fabric woven at 55×55 ends/inch (21.7×21.7 ends/cm), but an inferior tear strength of 38×36 kg compared to 42×40 kg for the nylon fabric. The basis weight of the fabrics was not disclosed. (The values indicated on either side of x represent the properties in the warp×weft.)

U.S. Pat. Nos. 6,037,047 and 6,147,017 to Fasteneau et al. disclose industrial fibers with non-circular cross-sections that give fabrics with improved cover. The non-circular cross-section of the filament is determined by aspect ratio. These patents disclose aspect ratios in a range from 2-6.

Japanese Application 2002-309462 to Tomomichi et al discloses a nylon airbag fabric woven from flat cross-section yarns that has lower air permeability. No comparison to a polyester airbag was given.

None of the prior art documents teaches how to obtain the balance of properties required for an uncoated fabric with the tongue tear resistance and trapezoidal tear resistance within the range of the present invention that is comparable to or better than nylon. In fact Japanese Application 7-90747 illustrates the inferior fabric tear strength of a polyester fabric compared to a nylon fabric. Further, none of the prior documents discloses that the uncoated fabrics with tear resistance comparable to or better than nylon can be improved (decrease air permeability) with coatings or employing fibers that have a flatter type cross-section (compared to standard round cross-sectional fibers).

SUMMARY OF THE INVENTION

The present invention is an improvement over polyester filament fabrics known in the art in that these polyester woven fabrics have a trapezoid tear resistance and tongue tear resistance equivalent to or superior to that of nylon woven fabrics.

In the broadest sense the present invention comprises a plain weave fabric constructed of a polyester homopolymer with a warp tongue tear resistance of at least 0.75 N/g/m$^2$.

The broadest scope of the present invention also encompasses the balance of yarn properties wherein said yarn has a tenacity of at least 65 cN/tex, and a tensile index of at least 350.

In the broadest sense the present invention comprises a fabric having an uncoated polyester woven fabric having a tear strength comparable or exceeding that of a nylon filament woven air bag fabric.

The broadest scope of the present invention comprises an improved uncoated polyester filament plain weave fabric woven from a polyester yarn having a dtex in the range of about 200 to about 800, a tenacity of at least about 65 cN/tex, and a tensile index of at least about 350.

In the broadest sense the present invention comprises a plain weave fabric having a tear strength comparable or exceeding that of a nylon filament plain weave air bag of identical construction or similar fabric construction and weight, wherein the warp and/or filling filaments for both the polyester and the nylon are non-round in cross-section (they have an aspect ratio greater than 1.2).

DESCRIPTION OF THE PREFERRED EMBODIMENTS

Polyethyleneterephthalate (PET) homopolymer is prepared by one of two processes, namely: 1) the ester interchange process and 2) the direct esterification process. In the ester interchange process, dimethyl terephthalate (DMT) is reacted with ethylene glycol (transesterification) to yield bis (2-hydroxy ethyl) terephthalate (monomer) along with minor amounts of other reaction products (oligomers), and methanol. Because the reaction is reversible, it is necessary to remove the methanol to completely convert the raw materials into monomer. It is known to use magnesium and/or cobalt and/or zinc in the ester interchange reaction. The catalyst activity is then sequestered by introducing phosphorus, for example, in the form of polyphosphoric acid (PPA), at the end of the ester interchange reaction. The monomer then under goes a condensation process (polycondensation) which polymerizes the monomer to PET. When the monomer under goes polycondensation, the catalyst most frequently employed is antimony. If the catalyst employed in the ester interchange reaction is not sequestered with phosphorus, the resultant polymer easily degrades (thermodegradation) and has a very unacceptable yellow color.

The second method of making PET is to react terephthalic acid (TA) and ethylene glycol by a direct esterification reaction producing bis (2 hydroxyethyl) terephthalate, oligomers, and water. This reaction is also reversible and thus can be carried to completion by removing the water during the reaction process. The direct esterification step does not require a catalyst and conventionally no catalyst is employed. Just as in the DMT process, the monomer then under goes polycondensation to form PET. The polycondensation reaction typically uses antimony as a catalyst, however, titanium in the form of a titanium compound is also a respected typical catalyst.

The polyester homopolymer of the present invention was then spun, and drawn, relaxed, and wound on a bobbin as described in U.S. Pat. No. 6,471,906 to DeBenedictis et al. This patent is hereby incorporated by reference thus describing a suitable process for manufacturing the fiber of the present invention. Other known processes for relaxing the fiber may also be employed with the present invention provided such processes can achieve at least a minimum 8% relax.

The present invention is contemplated using a polyester homopolymer. However, minor amounts of other ingredients may also be present, generally comprising no more than 2% by weight based on the rate of the polyester homopolymer, such as processing aids like $TiO_2$, permanent yarn coatings that would reduce its coefficient of friction for example, or increase its adhesion to other substances such as rubber, for example or to make it more UV stable, and less brittle.

To achieve the properties of the fabric set forth in the claims, it is important to note that if the yarn tenacity is too low the fabric strength will be too low. The minimum tenacity of the yarn is about 65 cN/tex. It is important to process the polyester yarn such that its tensile index is greater than about 350. The hot air shrinkage of the polyester yarn is generally less than about 6%, the invention is not relying on a high fabric shrinkage in order to achieve high tear resistance.

A plain, 1×1, weave is preferred in order to minimize the air permeability of the air bag fabric. Yarn linear densities of about 200 to about 800 dtex are used, depending on which type of air bag is required. The higher dtex yarns are woven for the larger passenger air bags, compared to the lower dtex yarns for the side curtain. The filament in the yarns for the fabric can be non-round, flatter type filament. Typically the flatness of filaments is determined by the aspect ratio. The aspect ratio is the ratio of the length to the width of the filament (round cross-sections have an aspect ratio of 1.0). The larger the aspect ratio, the flatter the yarn. Preferred aspect ratios are between 1.2 and 6. Flatter type filaments make the fabric less air permeable. However there is a practical limitation in that filaments beyond about a 6 aspect ratio do not provide any significant improvement and are more difficult to weave. An aspect ratio less than about 1.2 does not provide any significant improvement over round type filaments.

The fabrics can be coated with neoprene, chloroprene, polyurethane, silicone, or other organic coatings to reduce air permeability and as an insulation shield, especially in the driver side air bag.

TEST PROCEDURES

Yarn Physical Properties
ASTM D885-02: Tenacity and elongation using a gauge length of 254 cm and a strain rate of 120%. Free Shrinkage (no load) was measured at 177° C. for 30 min. Linear density (dtex) was measured using Option 1 of Test Method D1907.

Tensile Index is the product of tenacity and the square root of the elongation at break.

Fabric Strip Physical Properties
ASTM D5035-95

Fabric Grab Properties
ASTM D5034-95

Fabric Tongue Tear
ASTM D2261-96

Fabric Trapezoidal Tear
ASTM D5587-96

Fabric Air Permeability
The static air permeability was measured according to ASTM D737-96, using a differential pressure of 125 Pa. The dynamic air permeability was measured according to ASTM D6476-02.

Yarn Intrinsic Viscosity (IV)
The relative viscosity (RV) of a 3% solution of the polyester in orthochlorophenol was measured at 25° C. using an Ubbelhode viscometer. The intrinsic viscosity (IV) was calculated from the following relationship:

$$RV = 1 + IV \times C + 0.305 \times IV^2 \times C^2 + 1.85 \times 10^{-5} \times \exp^{(4.5 \times IV)} \times C^4$$

Where C is the solution concentration in gm/100 ml.

Examples 1-3

Polyester polymer, containing 0.08% $TiO_2$, was spun and drawn through a conventional spin-draw machine to give a yarn IV of 0.89. The process conditions are set forth in table 1.

TABLE 1

| Example | Draw Speed (meter per min.) | Draw Ratio | Relax Ratio (%) |
|---|---|---|---|
| 1 | 3705 | 5.56 | 9.3 |
| 2 | 3000 | 6.18 | 12.0 |
| 3 | 3000 | 6.18 | 15.5 |

The yarn physical properties of these examples, together with a commercial polyester yarn (KoSa T781) and two commercial nylon yarns (DuPont T725 and T743), are set forth in Table 2.

TABLE 2

| Sample | dtex | Tenacity (cN/tex) | Elongation (%) | Tensile Index | Hot Air Shrinkage (%) |
|---|---|---|---|---|---|
| Polyester T781 | 493 | 78.6 | 13.2 | 285 | 7.25 |
| Example 1 | 489 | 69.8 | 18.8 | 303 | 4.25 |
| Example 2 | 493 | 71.9 | 23.6 | 349 | 3.00 |
| Example 3 | 487 | 67.5 | 28.4 | 360 | 2.75 |
| Nylon T725 | 463 | 76.8 | 23.0 | 368 | 5.35 |
| Nylon T743 | 467 | 84.7 | 20.0 | 379 | 5.50 |

These yarns were woven in a plain weave with 48×43 ends per inch (18.9×16.9 ends per cm.) and a fabric weight of 176 g/m². The fabric weight of the T743 was slightly higher at 183 g/m². The fabrics were scoured and their physical properties measured, the results are set forth in Table 3.

TABLE 3

| Sample | Direction | Strip Strength (N) | Strip Elongation (%) | Grab Strength (N) | Grab Elongation (%) | Trapezoidal Tear (N) | Tongue Tear (N) |
|---|---|---|---|---|---|---|---|
| Polyester T781 | Warp | 1411 | 29.6 | 1598 | 29.5 | 391 | 116 |
| | Filling | 1263 | 25.7 | 1573 | 26.7 | 387 | 119 |
| Example 1 | Warp | 1174 | 30.7 | 1592 | 34.1 | 456 | 135 |
| | Filling | 1161 | 30.8 | 1618 | 34.6 | 418 | 130 |
| Example 2 | Warp | 1187 | 36.8 | 1617 | 41.8 | 553 | 152 |
| | Filling | 1245 | 37.3 | 1733 | 42.0 | 545 | 131 |
| Example 3 | Warp | 1156 | 45.7 | 1707 | 48.9 | 589 | 151 |
| | Filling | 1116 | 43.4 | 1642 | 49.4 | 518 | 139 |
| Nylon T725 | Warp | 1338 | 42.6 | 1863 | 46.3 | 560 | 119 |
| | Filling | 1210 | 37.6 | 1686 | 42.9 | 464 | 123 |
| Nylon T743 | Warp | 1730 | 37.5 | 2282 | 43.0 | 423 | 143 |
| | Filling | 1536 | 32.3 | 1890 | 34.2 | 329 | 138 |

In spite of a reduction in yarn tenacity for the Examples (Table 2), the fabric grab strengths (Table 3) were higher than the commercial T781 polyester fabric. More surprising is the fact that the key tear properties (trapezoidal and tongue strength) match, and in the case of Examples 3 exceed that of the nylon controls.

The tear properties, normalized to the fabric basis weight, are set forth in Table 4.

TABLE 4

| Sample | Direction | Trapezoidal Tear (N/g/m$^2$) | Tongue Tear (N/g/m$^2$) |
|---|---|---|---|
| Polyester T781 | Warp | 2.22 | 0.66 |
| | Filling | 2.20 | 0.68 |
| Example 1 | Warp | 2.59 | 0.77 |
| | Filling | 2.37 | 0.74 |
| Example 2 | Warp | 3.14 | 0.86 |
| | Filling | 3.10 | 0.75 |
| Example 3 | Warp | 3.35 | 0.86 |
| | Filling | 2.94 | 0.79 |
| Nylon T725 | Warp | 3.18 | 0.67 |
| | Filling | 2.64 | 0.70 |
| Nylon T743 | Warp | 2.32 | 0.78 |
| | Filling | 1.80 | 0.75 |

The polyester T781, Example 3 and nylon T743 fabrics were coated with a silicone rubber (40 g/m$^2$). The coated fabric physical properties are set forth in Table 5.

TABLE 5

| Sample | Weight g/m$^2$ | Direction | Grab Strength (N) | Grab Elongation (%) | Tongue Tear (N) | Tongue Tear (N/g/m$^2$) |
|---|---|---|---|---|---|---|
| Polyester T781 | 221 | Warp | 1929 | 27.3 | 251 | 1.13 |
| | | Filling | 2058 | 32.1 | 259 | 1.17 |
| Example 3 | 210 | Warp | 1890 | 32.0 | 293 | 1.39 |
| | | Filling | 1792 | 38.0 | 316 | 1.50 |
| Nylon T743 | 214 | Warp | 2241 | 33.7 | 263 | 1.23 |
| | | Filling | 2116 | 49.2 | 227 | 1.06 |

Even after coating, the fabric from inventive Example 3 showed superior tear properties to nylon and prior art polyester fabrics.

Example 4-7

Higher decitex yarns (720 dtex) with different number of filaments and cross-section were made as in Examples 1-3. The aspect ratio is the ratio of the length to the width of the filament (round cross-sections have an aspect ratio of 1.0). Oval cross-sections were obtained by using a rectangular spinneret. The process conditions are set forth in Table 6.

TABLE 6

| Example | Number of Filaments | Aspect ratio | Draw Speed (meter per min.) | Draw Ratio | Relax Ratio (%) |
|---|---|---|---|---|---|
| 4 | 140 | 1.0 | 3000 | 5.95 | 12.5 |
| 5 | 192 | 1.0 | 3650 | 5.62 | 12.75 |
| 6 | 200 | 1.8 | 3218 | 5.55 | 13.0 |
| 7 | 200 | 1.8 | 4265 | 4.80 | 13.0 |

The physical properties are set forth in Table 7.

TABLE 7

| Example | dtex | Tenacity (cN/tex) | Elongation (%) | Tensile Index | Hot Air Shrinkage (%) |
|---|---|---|---|---|---|
| 4 | 720 | 69.9 | 28.1 | 371 | 2.5 |
| 5 | 728 | 69.9 | 26.6 | 360 | 3.0 |
| 6 | 722 | 74.0 | 27.5 | 388 | 3.5 |
| 7 | 720 | 68.1 | 22.9 | 325 | 4.0 |

These yarns were woven, in a plain weave, into commercial air bag fabrics. The yarn of Example 4 was used as the warp in Fabrics 4, 5, and 6, with the yarn in Examples 4, 5 and 6 used as the filling yarn. Fabric 7 used yarn from Example 7 in both warp and filling. The fabric properties, compared to the specifications established for nylon fabrics, are set forth in Table 8.

TABLE 8

| Test | | Units | Nylon Min./Max. | Fabric 4 | Fabric 5 | Fabric 6 | Fabric 7 |
|---|---|---|---|---|---|---|---|
| Construction: | warp | | | Ex. 4 | Ex. 4 | Ex. 4 | Ex. 7 |
| | filling | | | Ex. 4 | Ex. 5 | Ex. 6 | Ex. 7 |
| Fabric weight | | g/m$^2$ | 220/270 | 238 | 241 | 246 | 262 |
| Construction: | warp | Threads | 152/168 | 165 | 161 | 164 | 165 |
| | filling | per dm | 152/168 | 157 | 157 | 161 | 161 |
| Tensile Strip | warp | N | 2224 | 3812 | 3814 | 3768 | 2335 |
| Strength: | filling | | 2224 | 3432 | 3411 | 3464 | 2482 |
| Tensile Strip | warp | % | 25/55 | 30 | 30 | 32 | 32 |
| elongation: | filling | | 25/55 | 41 | 37 | 35.5 | 43.5 |
| Grab Tensile | warp | N | 2224 | 2790 | 2744 | 2736 | — |
| Strength: | filling | | 2224 | 2860 | 2526 | 2655 | — |
| Grab Tensile | warp | % | 25/55 | 38 | 40 | 39 | — |
| elongation: | filling | | 25/55 | 50 | 47 | 51 | — |
| Tongue Tear | warp | N | 200 | 219 | 230 | 230 | 228 |
| Strength: | filling | | 200 | 217 | 237 | 216 | 231 |
| Tongue Tear | warp | N/g/m$^2$ | 0.74 | 0.92 | 0.95 | 0.93 | 0.87 |
| Strength: | filling | | 0.74 | 0.91 | 0.98 | 0.88 | 0.88 |
| Static Air Permeability | | 1/dm$^2$/min. | 0/10 | 30 | 22.5 | 10 | 5.7 |
| Dynamic Air Permeability | | mm/sec | 300/700 | 1490 | 1310 | 670 | 515 |

These fabric examples shows that polyester yarn made according to this invention will generally satisfy the air bag specifications established for nylon fabrics. Both the fabric made with a higher dtex/filament filling yarn (Example 5) and the oval cross-section filling yarn (Example 6) with a 720 dtex 140 filament warp, maintained their superior tongue tear strength, while decreasing the fabric air permeability. The fabric made from the lower tensile index (325) oval cross-section yarn (Example 7) in both warp and filling not only satisfied the tear strength specifications, but also the static and dynamic air permeability specifications.

Example 8

A lower decitex, round cross-section yarn (380 dtex with 70 filaments) was made as in Examples 1-3, and compared with commercial polyester industrial yarns, T787 and T781 from KoSa. Lower decitex yarns are used in side curtain airbags. The process conditions are set forth in Table 9.

TABLE 9

| Example | Draw Speed (meter per min.) | Draw Ratio | Relax Ratio (%) |
|---|---|---|---|
| 8 | 2000 | 6.2 | 20 |
| Polyester Type 781 | 3500 | 5.2 | 2.5 |
| Polyester Type 787 | 3750 | 5.4 | 13 |

The physical properties are set forth in Table 10.

TABLE 10

| Example | dtex | Tenacity (cN/tex) | Elongation (%) | Tensile Index | Hot Air Shrinkage (%) |
|---|---|---|---|---|---|
| 8 | 378 | 66.2 | 32.5 | 377 | 2.2 |
| Polyester Type 781 | 378 | 77.7 | 16.1 | 312 | 6.0 |
| Polyester Type 787 | 378 | 71.5 | 22.6 | 340 | 3.0 |

This yarn was woven in a plain weave into a commercial air bag fabric. The fabric properties are set forth in Table 11 below.

TABLE 11

| Test | | Units | Example 8 | Polyester T781 | Polyester T787 |
|---|---|---|---|---|---|
| Fabric weight | | g/m² | 170 | 160 | 166 |
| Construction: | warp | Threads | 57 | 54 | 59 |
| | filling | per cm | 45 | 46 | 51 |
| Tensile Strip | warp | N | 2220 | 2767 | 2396 |
| Strength: | filling | | 1978 | 2055 | 2124 |
| Tensile Strip | warp | % | 58.8 | 30.0 | 38.5 |
| elongation: | filling | | 48.0 | 22.2 | 30.8 |
| Grab Tensile | warp | N | 1852 | 1855 | 1774 |
| Strength: | filling | | 1650 | 1243 | 1427 |
| Grab Tensile | warp | % | 57.5 | 31.5 | 39.5 |
| elongation: | filling | | 43.1 | 20.6 | 29.0 |
| Tongue Tear | warp | N | 136 | 116 | 109 |
| Strength: | filling | | 121 | 108 | 104 |
| Tongue Tear | warp | N/g/m² | 0.80 | 0.73 | 0.66 |
| Strength: | filling | | 0.71 | 0.68 | 0.63 |
| Trapezoidal | warp | N | 390 | 392 | 407 |
| Tear Strength: | filling | | 462 | 274 | 366 |
| Trapezoidal | warp | N/g/m² | 2.29 | 2.45 | 2.45 |
| Tear Strength: | filling | | 2.72 | 1.71 | 2.20 |

The higher tensile index of Example 7 (see Table 10) again gave a polyester fabric with superior tensile tear properties than prior art polyester fabrics.

Thus it is apparent that there has been provided, in accordance with the invention, a yarn, a process for making the yarn, and a fabric from the yarn that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. An improved uncoated polyester filament plain weave fabric woven from a polyester yarn having a tensile index of at least about 350, said fabric has a warp and/or filling tongue tear strength of at least 0.75 N/g/m².

2. The woven fabric of claim 1, wherein the said yarn has a tenacity of at least about 65 cN/tex.

3. The woven fabric of claim 1, wherein said fabric has a basis weight of between 150 to 300 g/m².

4. The woven fabric of claim 1, wherein said polyester yarn has a linear density of between 200 and 800 dtex.

5. An uncoated polyester airbag, comprising the plain weave polyester fabric of claim 1.

6. The polyester airbag of claim 5, wherein said fabric has a basis weight of between 150 to 300 g/m².

7. A polyester airbag having a plain weave fabric construction wherein said fabric is woven from a polyester yarn having a tensile index of at least about 350, said fabric has a basis weight of between 150 to 300 g/m² with tongue tear strength equal to or better than nylon airbags of the same construction and weight.

8. The airbag of claim 7, wherein said fabric is coated and said tongue tear strength is equal to or better than nylon airbags similarly coated and of the same construction and weight.

9. The airbag of claim 7, wherein said fabric is constructed of non-round yarns and said nylon airbags are similarly constructed.

10. A polyester filament plain weave fabric woven from polyester yarn, said yarn having a tensile index of at least about 350, said fabric having a basis weight of between 150 to 300 g/m² with tongue tear strength equal to or better than nylon fabrics of the same construction and weight.

11. The fabric of claim 10, wherein the warp and/or filling filaments of said fabric have an aspect ratio greater than 1.2.

12. The fabric of claim 11, wherein said aspect ratio is between 1.2 and 6.

13. The fabric of claim 10, wherein the filling yarns of said fabric are round in cross-section.

14. The fabric of claim 10, wherein said fabric is coated.

15. The fabric of claim 14, wherein said coating is selected from chloroprene, neoprene, polyurethane, silicon or other organic coatings to reduce air permeability.

16. The fabric of claim 14, wherein said warp and/or filling filaments of said fabric have an aspect ratio greater than 1.2.

17. The fabric of claim 16, wherein said filling yarns of said fabric are round in cross-section.

18. A polyester filament plain weave fabric woven from polyester yarn, said yarn having a tensile index of at least about 350, said fabric having a basis weight of between 150 to 300 g/m² with a tongue tear strength of at least 0.75 N/g/m², wherein the warp and/or filling filaments of said fabric have an aspect ratio between 1.2 and 6.

19. The fabric of claim 18, wherein said fabric is coated.

20. The fabric of claim 19, wherein said coating is selected from chloroprene, neoprene, polyurethane, silicone or other organic coatings to reduce air permeability.

21. An improved uncoated polyester filament plain weave fabric woven from a polyester yarn having a tensile index of at least about 350, said fabric has a warp and filling tongue tear strength of at least 0.7 N/g/m².

22. The woven fabric of claim 21, wherein said fabric has a basis weight of between 150 to 300 g/m².

23. The woven fabric of claim 21, wherein said polyester yarn has a linear density of between 200 and 800 dtex.

24. The polyester airbag of claim 5, wherein the yarn of said fabric has a tenacity of at least about 65 cN/tex.

25. The polyester airbag of claim 5, wherein the yarn of said fabric has a linear density of between 200 and 800 dtex.

26. The polyester airbag of claim 7, wherein said polyester yarn has a tenacity of at least about 65 cN/tex.

27. The polyester airbag of claim 7, wherein said polyester yarn has a linear density of between 200 and 800 dtex.

28. The airbag of claim 8, wherein said fabric is coated with a coating selected from chloroprene, neoprene, polyurethane, silicone or other organic coatings to reduce air permeability.

29. The woven fabric of claim 10, wherein the said polyester yarn has a tenacity of at least about 65 cN/tex.

30. The woven fabric of claim 10, wherein said polyester yarn has a linear density of between 200 and 800 dtex.

31. The woven fabric of claim 18, wherein the said polyester yarn has a tenacity of at least about 65 cN/tex.

32. The woven fabric of claim 18, wherein said polyester yarn has a linear density of between 200 and 800 dtex.

33. The woven fabric of claim 21, wherein the said polyester yarn has a tenacity of at least about 65 cN/tex.

* * * * *